US008789109B2

(12) United States Patent
Joh

(10) Patent No.: US 8,789,109 B2
(45) Date of Patent: Jul. 22, 2014

(54) SYSTEM FOR RECOMMENDING FAVORITE CHANNEL/PROGRAM BASED ON TV WATCHING PATTERN AND METHOD THEREOF

(71) Applicant: Electronics and Telecommunications Research Institute, Daejeon (KR)

(72) Inventor: Jungwoo Joh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/653,826

(22) Filed: Oct. 17, 2012

(65) Prior Publication Data

US 2013/0097624 A1    Apr. 18, 2013

(51) Int. Cl.
*H04H 60/32* (2008.01)
*H04N 5/445* (2011.01)

(52) U.S. Cl.
USPC .............................................. 725/46; 725/14

(58) Field of Classification Search
USPC ...................................................... 725/46, 14
See application file for complete search history.

(56) References Cited

U.S. PATENT DOCUMENTS

| | | | |
|---|---|---|---|
| 7,051,352 B1* | 5/2006 | Schaffer | 725/39 |
| 2002/0178448 A1* | 11/2002 | Te Kiefte et al. | 725/46 |
| 2003/0177110 A1* | 9/2003 | Okamoto et al. | 707/3 |
| 2003/0229896 A1* | 12/2003 | Buczak | 725/46 |
| 2005/0022239 A1* | 1/2005 | Meuleman | 725/46 |
| 2005/0283791 A1* | 12/2005 | McCarthy et al. | 725/1 |
| 2006/0123448 A1* | 6/2006 | Ma et al. | 725/51 |
| 2006/0212904 A1* | 9/2006 | Klarfeld et al. | 725/46 |
| 2009/0313086 A1* | 12/2009 | Lee et al. | 705/10 |
| 2012/0266192 A1* | 10/2012 | Crew et al. | 725/40 |
| 2012/0291057 A1* | 11/2012 | Gunda et al. | 725/14 |

FOREIGN PATENT DOCUMENTS

KR    10-2002-0033202    5/2002

OTHER PUBLICATIONS

Han-kyu Lee et al., "A Bayesian Network Model for User's Preference Estimation of Personalized TV Service," 13th International Conference on Advanced Communication Technology (ICACT), Feb. 13-16, 2011, pp. 1555-1558.

* cited by examiner

*Primary Examiner* — James R Sheleheda
(74) *Attorney, Agent, or Firm* — Rabin & Berdo, P.C.

(57) ABSTRACT

Disclosed are a system for recommending a favorite channel/program based on a television (TV) watching pattern and a method thereof. The present invention provides a system and a method for recommending a favorite channel/program by learning a television (TV) watching pattern using a Bayesian network, by extracting recommended candidate favorite channel/programs by applying an entropy theory to the learned Bayesian network, and by applying a fuzzy logic operation to the extracted candidate favorite channel/programs.

14 Claims, 6 Drawing Sheets

SYSTEM FOR RECOMMENDING FAVORITE CHANNEL/PROGRAM BASED ON TV WATCHING PATTERN AND METHOD THEREOF

CROSS-REFERENCE TO RELATED APPLICATIONS

This application claims priority to and the benefit of Korean Patent Application No. 10-2011-0106089 filed in the Korean Intellectual Property Office on Oct. 17, 2011 and 10-2012-0088364 filed in the Korean Intellectual Property Office on Aug. 13, 2012, the entire contents of which are incorporated herein by reference.

TECHNICAL FIELD

The present invention relates to a method of recommending a favorite channel/program, and more particularly, to a system and a method for recommending a favorite channel/program by learning a TV watching pattern using a Bayesian network, by extracting candidate favorite channel/programs by applying an entropy theory to the learned Bayesian network, and by applying a fuzzy logic operation to the extracted candidate favorite channel/programs.

BACKGROUND ART

According to an increase in types of television (TV) channels and programs, wide selections are provided to a user. On the other hand, inconvenience that the user needs to find a desired TV channel and program also occurs. As a method for solving the above inconvenience, proposed is a solution that utilizes a Bayesian network theory. The above method performs learning of a user TV watching pattern from a perspective of a probability and recommends a favorite TV channel/program for each user based on a learned probability value.

However, an existing approach method utilizing the Bayesian network theory has the following problems.

The original purpose of a TV is to provide relaxation. However, for example, in the case of intensively watching an Educational Broadcasting (EBS) channel to preparing for a college entrance examination, when a user later desires to watch other TV channels for the purpose of relaxation, the EBS channel acquires a high watching probability simply due to intensive viewing, which is different from the original intent of the user. On the contrary, when the user makes time out of busy schedule and watches a favorite TV program only for a short time, a watching probability is low and thus, the favorite TV program may not be considered within the recommending rankings of TV programs. Consequently, an optimal recommendation suitable for the intent of the user may not be performed.

SUMMARY OF THE INVENTION

The present invention has been made in an effort to provide a system and a method for recommending a favorite channel/program by learning a television (TV) watching pattern using a Bayesian network, by extracting recommended candidate favorite channel/programs by applying an entropy theory to the learned Bayesian network, and by applying a fuzzy logic operation to the extracted candidate favorite channel/programs.

However, the purpose of the present invention is not limited to the aforementioned description and other purposes not described may be clearly understood by those skilled in the art from the following description.

An exemplary embodiment of the present invention provides a system for recommending a favorite channel/program, the system including: a Bayesian network learning unit to learn a Bayesian network based on received watching pattern information of a user and thereby calculate a first probability value with respect to all of the channels or programs based on the learning result; a candidate favorite channel/program extracting unit to extract a candidate favorite channel or a candidate favorite program based on the calculated first probability value; a fuzzy logic operation unit to perform a fuzzy logic inference operation with respect to the extracted candidate favorite channel or candidate favorite program, and to calculate a second probability value with respect to each candidate favorite channel or candidate favorite program based on the performance result; and a favorite channel/program recommending unit to determine a favorite channel or a favorite program according to the watching pattern information of the user based on the calculated first probability value and second probability value.

The candidate favorite channel/program extracting unit may apply an entropy function to the first probability value calculated by the Bayesian network learning unit, and may extract, as the candidate favorite channel or the candidate favorite program, a portion of or all of channels or programs corresponding to the first probability value when a result value of the entropy function obtained as the application result is less than or equal to a predetermined threshold.

The fuzzy logic operation unit may perform a fuzzy logic operation based on a preference received from the user with respect to each candidate favorite channel or candidate favorite program, and predetermined rules, and may calculate the second probability value with respect to each candidate favorite channel or candidate favorite program based on the performance result.

The fuzzy logic operation unit may include: a fuzzifier to perform fuzzification for assigning a membership grade with respect to the preference received from the user and thereby output a fuzzified value as the performance result; a fuzzy inference unit to perform a fuzzy inference based on the output fuzzified value and the predetermined rules; and a defuzzifier to perform defuzzification with respect to a result value obtained as the fuzzy inference result and thereby output a defuzzified second probability value as the performance result.

The preference may be information indicating a favor or a disfavor with respect to each channel or program that is received from the user.

The predetermined rules may indicate an IF-THEN rule that is a sentence expressing a relationship between predetermined facts.

The favorite channel/program recommending unit may employ, as the second probability value, a first probability value of a channel or a program corresponding to the second probability value among all of the channels or the programs, and may update the first probability value of a remaining channel or program through a proportional operation based on the second probability value and thereby determine and recommend the favorite channel or the favorite program based on the updated first probability value.

The watching pattern information may include an amount of TV watching time for each day, an amount of TV watching time for each time zone, a total amount of watching time for each channel, and an amount of watching time for each program genre.

Another exemplary embodiment of the present invention provides a method of recommending a favorite channel/program, the method including: learning a Bayesian network based on received watching pattern information of a user to thereby calculate a first probability value with respect to all of the channels or programs based on the learning result; extracting a candidate favorite channel or a candidate favorite program based on the calculated first probability value; performing a fuzzy logic inference operation with respect to the extracted candidate favorite channel or candidate favorite program, and calculating a second probability value with respect to each candidate favorite channel or candidate favorite program based on the performance result; and determining a favorite channel or a favorite program according to the watching pattern information of the user based on the calculated first probability value and second probability value.

The extracting may apply an entropy function to the calculated first probability value, and may extract, as the candidate favorite channel or the candidate favorite program, a portion of or all of channels or programs corresponding to the first probability value when a result value of the entropy function obtained as the application result is less than or equal to a predetermined threshold.

The calculating of the second probability value may perform a fuzzy logic operation based on a preference received from the user with respect to each candidate favorite channel or candidate favorite program, and predetermined rules, and may calculate the second probability value with respect to each candidate favorite channel or candidate favorite program as the performance result.

The calculating of the second probability value may include: performing fuzzification for assigning a membership grade with respect to the preference received from the user to thereby output a fuzzified value as the performance result; performing a fuzzy inference based on the output fuzzified value and the predetermined rules; and performing defuzzification with respect to a result value obtained as the fuzzy inference result and thereby outputting a defuzzified second probability value as the performance result.

The preference may be information indicating a favor or a disfavor with respect to each channel or program that is received from the user.

The predetermined rules may indicate an IF-THEN rule that is a sentence expressing a relationship between predetermined facts.

The determining may employ, as the second probability value, a first probability value of a channel or a program corresponding to the second probability value among all of the channels or the programs, and may update the first probability value of a remaining channel or program through a proportional operation based on the second probability value and thereby determine and recommend the favorite channel or the favorite program based on the updated first probability value.

The watching pattern information may include an amount of TV watching time for each day, an amount of TV watching time for each time zone, a total amount of watching time for each channel, and an amount of watching time for each program genre.

According to exemplary embodiments of the present invention, it is possible to efficiently extract a favorite channel/program by learning a TV watching pattern using a Bayesian network, by extracting recommended candidate favorite channel/programs by applying an entropy theory to the learned Bayesian network, and by recommending the favorite channel/program by applying a fuzzy logic operation to the extracted candidate favorite channel/programs.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
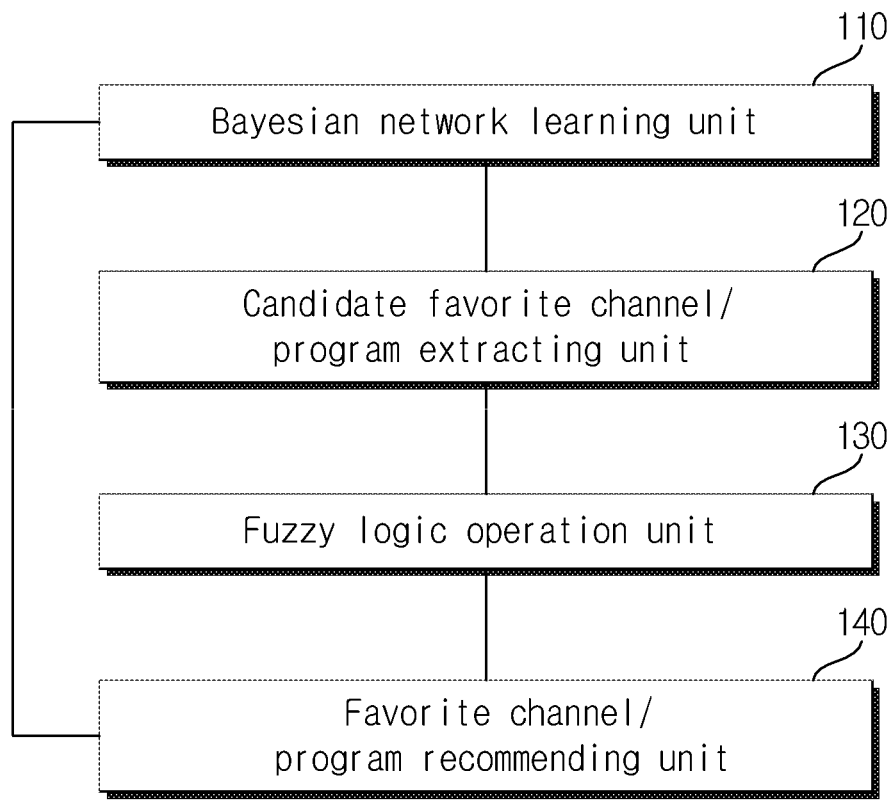
FIG. 1 is a diagram illustrating a system for recommending a favorite channel/program according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, a system and a method for recommending a favorite channel/program based on a television (TV) watching pattern according to exemplary embodiments of the present invention will be described in detail based on an operation and effect with reference to the accompanying FIGS. 1 through 8. In the case of reference numerals used throughout the present specification, like reference numerals used in the respective drawings refer to like constituent elements. When it is determined that the detailed description related to a related known function or configuration may make the purpose of the present invention unnecessarily ambiguous in describing the present invention, the detailed description will be omitted here.

In particular, the present invention proposes a new method to make it possible to determine and recommend a favorite channel/program by learning a TV watching pattern using a Bayesian network, by extracting candidate favorite channel/programs by applying an entropy theory to the learned Bayesian network, and by applying a fuzzy logic operation to the extracted candidate favorite channel/programs.

FIG. 1 is a diagram illustrating a system for recommending a favorite channel/program according to an exemplary embodiment of the present invention.

As illustrated in FIG. 1, the system for recommending the favorite channel/program according to the present invention may include a Bayesian network learning unit 110, a candidate favorite channel/program extracting unit 120, a fuzzy logic operation unit 130, and a favorite channel/program recommending unit 140.

In this instance, the system for recommending the favorite channel/program according to the present invention may operate by collecting channel data input by a user.

The Bayesian network learning unit 110 may receive predetermined watching pattern information, for example, an amount of TV watching time for each day, an amount of TV watching time for each time zone, a total amount of watching time for each channel, an amount of watching time for each program genre, and the like. The watching pattern information may be increased or decreased depending on necessity.

The Bayesian network learning unit 110 may learn a pre-designed Bayesian network using the received watching pattern information, which will be described with reference to FIG. 2.

Figure 2:
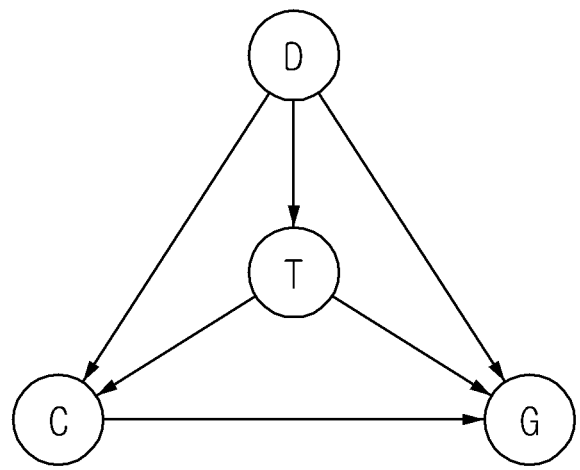
FIG. 2 is a diagram illustrating a structure of a Bayesian network according to an exemplary embodiment of the present invention.

FIG. 2 is a diagram illustrating a structure of a Bayesian network according to an exemplary embodiment of the present invention.

As illustrated in FIG. 2, the Bayesian network learning unit 110 may configure the Bayesian network using, for example, an amount of TV watching time for each day D, an amount of TV watching time for each time zone T, a total amount of watching time for each channel C, and an amount of watching time for each program genre G.

As one example, day may be classified as Monday, Tuesday, Wednesday, Thursday, Friday, Saturday, and Sunday, and time zone may be classified as early morning 5 to 7, morning 8 to 12, afternoon 13 to 17, evening 18 to 20, and night 21 to 24.

In this instance, the structure of the Bayesian network may be modified based on input watching pattern information and thus, is not limited to a predetermined form and inclusively includes other various types of designs.

The structure of the Bayesian network configured by the Bayesian network learning unit 110 may be defined using a probability equation considering all of the watching pattern information D, T, C, and G as shown in the following Equation 1. That is, using the input watching pattern information, the Bayesian network learning unit 110 obtains four right probability terms of Equation 1, p(D), P(T|D), P(C|D, T), and p(G|D, T, C), and learns a left probability term of Equation 1 by multiplying the obtained four right probability terms p(D), P(T|D), P(C|D, T), and p(G|D, T, C).

$$p(D,T,G,C)=p(D)p(T|D)p(C|D,T)p(G|D,T,C) \quad \text{[Equation 1]}$$

Here, D denotes an amount of TV watching time for each day, T denotes an amount of TV watching time for each time zone, C denotes a total amount of watching time for each channel, and G denotes an amount of watching time for each program genre.

Accordingly, the Bayesian network learning unit 110 may calculate a first probability value p(D,T,G,C) with respect to all of the channels or programs based on the learning result.

The candidate favorite channel/program extracting unit 120 may extract a candidate favorite channel or a candidate favorite program based on the first probability value calculated from the Bayesian network learning unit 110.

To extract a candidate favorite channel/program, the present invention utilizes an entropy concept. An entropy function H(X) may be expressed by the following Equation 2.

$$H(X) = -k\sum_{i=1}^{n} p(x_i)\log_b p(x_i)$$

Here, k denotes a variable set by a designer so that a maximum value obtained as the calculation result of the entropy function may be maintained to be "1" at all times, x denotes a probability variable, n denotes the maximum number of probability variables, and b denotes a variable set by the designer depending on necessity and generally uses "2".

Figure 3:
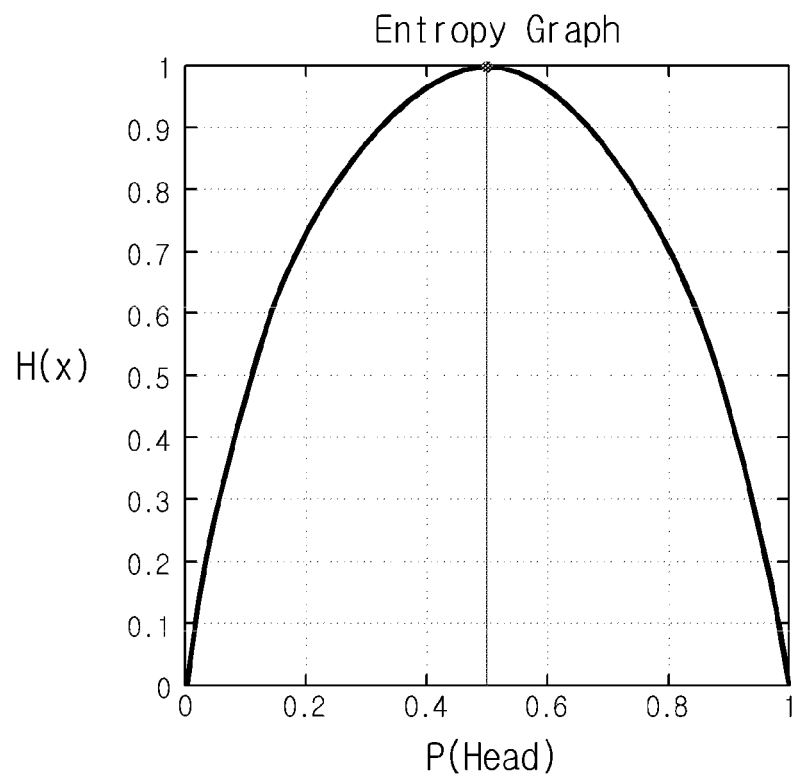
FIG. 3 is a graph illustrating an entropy equation with respect to a probability that heads and tails of a coin appear when a test of flipping the coin infinitely is performed according to an exemplary embodiment of the present invention.
Figure 3:
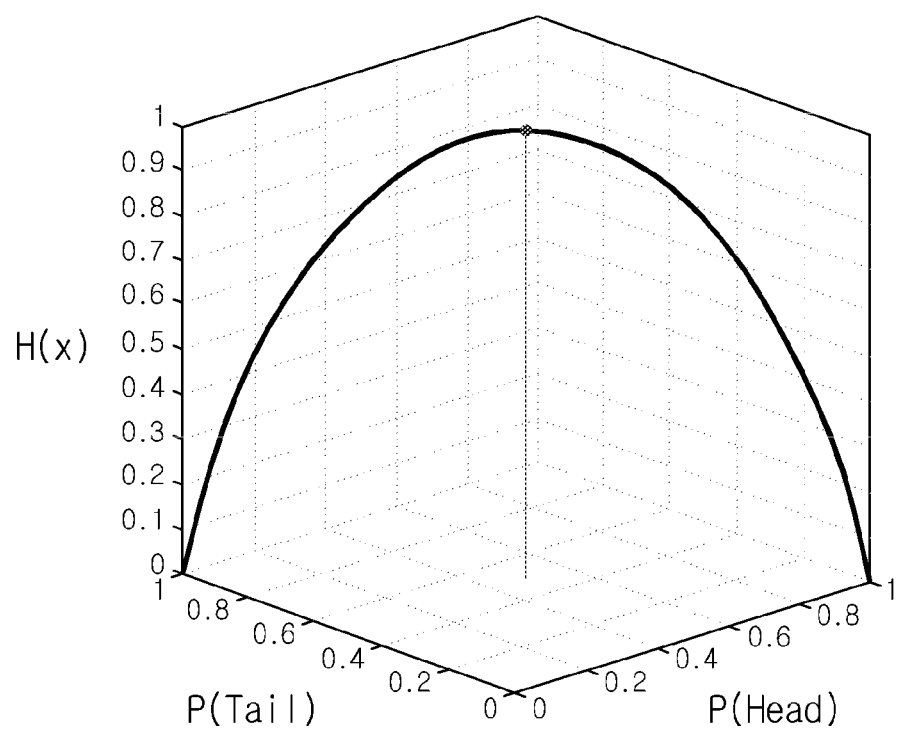

FIG. 3 is a graph illustrating an entropy equation with respect to a probability that heads and tails of a coin appear when a test of flipping the coin infinitely is performed according to an exemplary embodiment of the present invention.

As illustrated in FIG. 3, as a result value H(X) of an entropy function becomes closer to "1", it is difficult to predict whether a predetermined accident may occur or may not occur. As the result value H(X) of the entropy function becomes closer to "0", it becomes easier to predict whether the accident may occur. That is, when H(X) obtained as the result of applying the entropy function to a portion of or all of probability values that are obtained from the Bayesian network is less than or equal to a threshold, the tendency that a corresponding probability value is obtained from the Bayesian network may be predictable.

In the case of being predictable, a channel/program having the corresponding probability value may be a candidate favorite channel/program.

In this instance, the threshold may be determined and changed by the designer through a test.

In the test of flipping a coin, a probability value occurs in two items, heads of the coin and tails of the coin. Unlink this, in the Bayesian network, a probability value occurs in a channel and the number of programs according thereto. Depending on cases, only the number of channels may be about 200 and five to six programs for each channel may be present.

However, when a result value obtained by applying the entropy function is less than or equal to the threshold, it is possible to determine the tendency that in the case of flipping the coin, heads of the coin or tails of the coin may further appear. However, in the case of a TV channel and a TV program, there is no criterion capable of determining which items may further appear. In this case, when the result value of the entropy function is obtained to be less than or equal to the threshold, the number of candidate favorite channels/programs needs to be determined by performing an operation in the following order. In this instance, when the number of items, that is, the number of channels or programs to be substituted for the entropy function operation is at least three, a maximum value increases to be greater than "1". In this case, by setting a k value of the entropy function using an inverse number of the maximum value, even though the number of items to be substituted is plural, the maximum value needs to be maintained to be "1" at all times.

Next, a section is set by dividing an interval between "0" and "1" by the number of items to be substituted for the entropy function. For example, when the number of items, that is, the number of channels or programs to be substituted for the entropy function is three, the interval between "0" and "1" may be divided into three sections, that is, $[0, \frac{1}{3}]$, $[\frac{1}{3}, \frac{2}{3}]$, and $[\frac{2}{3}, 1]$.

Here, the threshold is set to ⅔, that is, 0.6667. This value may be changed to another value at any time by a designer, depending on necessity.

1) When the result value of the entropy function operation is greater than ⅔ (0.6667), it is possible to determine that meaningful inclination or tendency is absent in probability values of three channel or programs items.

2) When the result value of the entropy function operation is less than ⅔ (0.6667), it is possible to determine that meaningful inclination or tendency is present in probability values of three channel or programs items. In this case, whether to offer a user with a few meaningful channels/programs among the above three channels or programs needs to be determined.

When the result value of the entropy function operation is present within a section greater than ⅓ (0.3333) and less than ⅔ (0.6667), the number of candidate favorite channel items or candidate favorite program items is determined to be two. Two items are determined based on a descending order of a probability value.

On the other hand, when the result value of the entropy function operation is present within a section greater than "0" and less than ⅓ (0.3333), the number of candidate favorite channel items or candidate favorite program items is determined to be one.

The fuzzy logic operation unit 130 may perform a fuzzy logic inference operation with respect to each candidate favorite channel or candidate favorite program, and may calculate a second probability value with respect to each candidate favorite channel or candidate favorite program based on the performance result. The fuzzy logic operation unit 130 enables the user to directly input a preference with respect to each candidate favorite channel or candidate favorite program obtained as the result of the entropy function. For example, the user is enabled to directly input information indicating favor or disfavor that represents "like" or "hate". Here, the preference is generally expressed in a form of a human language such as "like", "hate", "like a little", "hate a little", "more like", "less like", and the like.

In the present invention, to handle the preference through the human language as above, a fuzzy logic capable of effectively handling uncertainty of language may be applicable. When desiring to express disfavor, a value close to "0" may be selected from among values between "0" and "1". When desiring to express favor, a value close to "1" may be selected from among the values between "0" and "1". Depending on cases, "0" may be selected to indicate the lowest disfavor and "1" may be selected to indicate the highest favor.

Rules are set to handle the preference input by the user. A rule is configured in a form of IF-THEN. A portion "IF" is referred to as an antecedent portion and a portion "THEN" is referred to as a consequent portion. A language variable corresponding to a condition is set to the antecedent portion and a language variable corresponding to a result is set to the consequent portion.

In this instance, each language variable includes a membership function. A triangle function among membership functions may be expressed by the following Equation 3.

$$\begin{cases} y = 2x & \text{where } 0 \le x < 0.5 \\ y = -2x + 2 & \text{where } 0.5 \le x \le 1 \end{cases} \quad \text{[Equation 3]}$$

Figure 4:
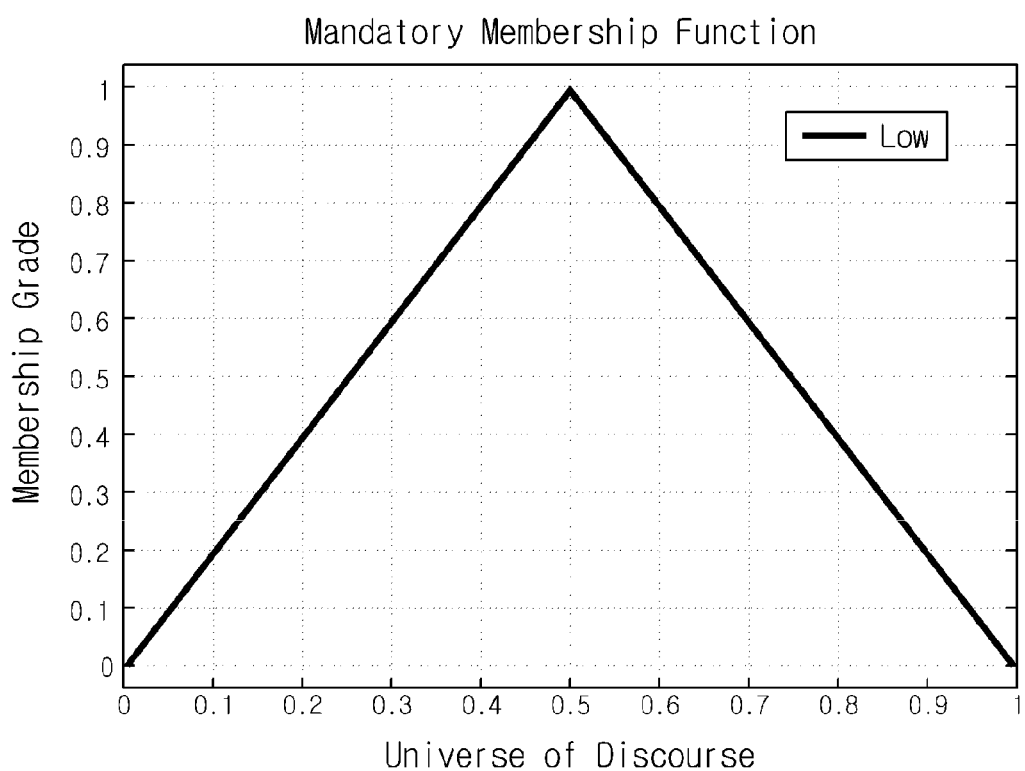
FIG. 4 is a graph illustrating a triangle function according to an exemplary embodiment of the present invention.

FIG. 4 is a graph illustrating a triangle function according to an exemplary embodiment of the present invention.

As shown in FIG. 4, even though the present invention applies the triangle function based on Equation 3 as a membership function, the present invention is not limited thereto and thus, may also apply a Gaussian function, a function in a form of a trapezoid, and the like.

The membership function of FIG. 4 is a type-1 membership function in a form expressed on a two dimension (2D), but is not limited thereto and thus, may include a type-2 membership function, an interval type-2 membership function, and the like.

When the membership function is determined, rules are set. Designed rules may be expressed by the following Table 1:

TABLE 1

1. IF P is High AND M is High, THEN R is High
2. IF P is Medium AND M is High, THEN R is Low
3. IF P is Low AND M is High, THEN R is Very_Low
4. IF P is High AND M is Medium, THEN R is High
5. IF P is Medium AND M is Medium, THEN R is Medium
6. IF P is Low AND M is Medium, THEN R is Low
7. IF P is High AND M is Low, THEN R is Very_High
8. IF P is Medium AND M is Low, THEN R is High
9. IF P is Low AND M is Low, THEN R is Low In the rules, the antecedent portion "IF" includes an item "preference (P)" and an item "mandatory (M)". Each item includes three language variables, "high", "medium", and "low". The consequent portion "THEN" includes an item "recommendation (R)". The item includes five language variables, "very high", "high", "medium", "low", and "very low". How to configure items of the antecedent portion "IF" and the consequent portion "THEN" and how to assign language variables for each item may be modified at any time by a designer, depending on necessity.

Figure 5:
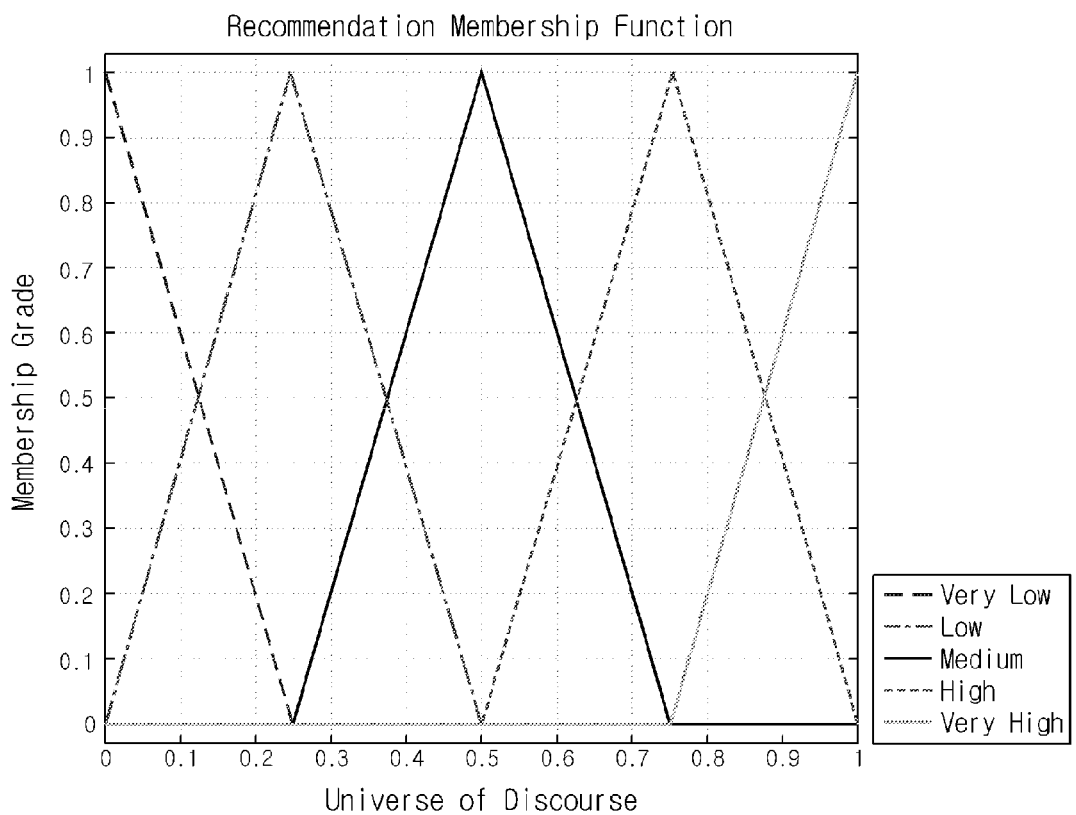
FIG. 5 is a graph illustrating five language variable membership function definitions with respect to an item "recommendation" of a consequent portion "THEN" according to an exemplary embodiment of the present invention.

FIG. 5 is a graph illustrating five language variable membership function definitions with respect to an item "recommendation" of a consequent portion "THEN" according to an exemplary embodiment of the present invention.

FIG. 5 illustrates five language variable membership functions, for example, "very high", "high", "medium", "low", and "very low" with respect to the item "recommendation" of the consequent portion "THEN".

The fuzzy logic operation unit 130 may perform a fuzzy logic inference operation based on a preference input by a user with respect to each candidate favorite channel or candidate favorite program, and predetermined rules, and may calculate a second probability value with respect to each candidate favorite channel or candidate favorite program based on the performance result.

The inference operation is required since the number of cases in which language variables do not match between the preference input by the user and the rules set by the designer is greater than the number of cases in which the language variables match. When a language variable set by the user is different from a language variable in the rule set by the designer, it is possible to induce a value therebetween through a fuzzy logic inference operation.

Figure 6:
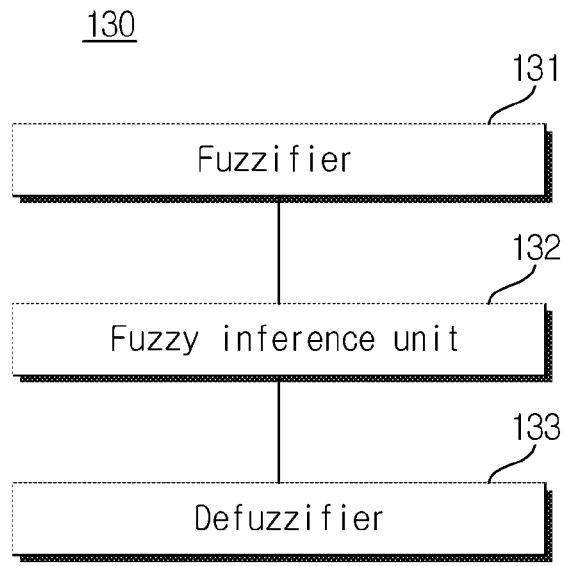
FIG. 6 is a diagram illustrating a detailed configuration of a fuzzy logic operation unit according to an exemplary embodiment of the present invention.

FIG. 6 is a diagram illustrating a detailed configuration of the fuzzy logic operation unit 130 according to an exemplary embodiment of the present invention.

As illustrated in FIG. 6, the fuzzy logic operation unit 130 according to the present invention may include a fuzzifier 131, a fuzzy inference unit 132, and a defuzzifier 133.

The fuzzifier 131 may receive a preference from a user with respect to a candidate favorite channel or a candidate favorite program. Here, an input value, that is, the preference may have a real number form.

In this instance, the input preference is in a form incapable of being handled in a fuzzy logic and thus, needs to be transformed to a form capable of being handled in the fuzzy logic. The above process is referred to as fuzzification.

Accordingly, the fuzzifier 131 may perform fuzzification for assigning a membership grade with respect to the input preference and thereby output a fuzzified value as the performance result.

The fuzzy inference unit 132 may perform a fuzzy inference based on the output fuzzified value and the rules. That is, when language variables included in an antecedent portion "IF" of the rule match the fuzzified value input to a system, the fuzzy inference unit 132 uses the result of the consequent portion "THEN" as is.

In many cases, the fuzzified value does not accurately match the language variable set in the antecedent portion "IF" of the rule. When language variables included in the antecedent portion "IF" of the rule do not match the fuzzified value input to the system, the result of the consequent portion "THEN" may not be utilized as is. In this instance, in a case where the fuzzified value input to the system is slightly different from language variables predetermined in the antecedent portion "IF", if it is possible to induce and thereby calculate a slightly different result value based on the set rules, it may be significantly useful. The above process is performed by the fuzzy inference unit 132. That is, when a rule "IF A, THEN B" is set by a designer and A' is input as the fuzzified value, the fuzzy inference unit 132 may perform the fuzzy inference and output B' as the performance result value.

A detailed process of performing the fuzzy inference may be expressed by the following Equation 4.

$$\mu_{B^i}(y) = \sup_{x \in X}[\mu_X(x) \star \mu_{F^i \to G^i}(x, y)] \qquad \text{[Equation 4]}$$
$$= \sup_{x \in X}[T^p_{i=1}\mu_{X_i}(x_i) \star [T^p_{i=1}\mu_{F'_i}(x_i)] \star \mu_{G^i}(y)]$$
$$= \sup_{x \in X}[T^p_{i=1}[\mu_{X_i}(x_i) \star \mu_{F'_i}(x_i)] \star \mu_{G^i}(y)]$$
$$= \mu_{G'}(y) \star \{\sup_{x_1 \in X_1}(\mu_{X_i}(x_1) \star \mu_{F'_i}(x_1)) \star \ldots \star$$
$$\sup_{x_p \in X_p}(\mu_{X_p}(x_p) \star \mu_{F^i_p}(x_p))\}$$

Here, sup[ ] indicates finding the largest value among membership grade values of the membership function, ★ denotes a T-Norm operation having a relatively small value by comparing membership grades with respect to the respective x coordinate values of two membership functions, T denotes a case where the number of T-Norm operations is plural, → denotes an operation between the antecedent portion "IF" and the consequent portion "THEN" in a single rule, sup indicates finding the largest value among membership grade values of the membership function, B denotes the entire range of a result value that an $i^{th}$ rule may have, F denotes the entire range of a value that the antecedent portion "IF" may have, G denotes the entire range of a value that the consequent portion "THEN" may have, and p denotes a total number of T-Norm operations repeated.

In this instance, the result value obtained as the result of the fuzzy inference operation is a numerical value that the membership function may not directly reflect the preference. Therefore, a single probability value available in an existing number system needs to be calculated from the membership function. The above process is referred to as defuzzification.

Accordingly, the defuzzifier 133 may perform defuzzification with respect to the result value output from the fuzzy inference unit 132, and may output a defuzzified second probability value as the performance result.

Among a variety of methods for the above defuzzification, the present invention employs a centroid method and a second probability value y(x) obtained through the above defuzzification process may be expressed by the following Equation 5:

$$y(x) = \frac{\sum f(x) \cdot x}{\sum f(x)} \qquad \text{[Equation 5]}$$

Here, y(x) denotes a function of which result value is induced and x denotes an input value input to a result function.

In this instance, even though the present invention applies the centroid method among methods for defuzzification, the present invention is not limited thereto and thus, other methods for defuzzification may be applicable depending on necessity.

The favorite channel/program recommending unit 140 may finally determine and recommend a favorite channel or a favorite program according to a watching pattern of a user based on the first probability value calculated from the Bayesian network learning unit 110 and the second probability value calculated from the fuzzy logic operation unit 130.

Hereinafter, an exemplary embodiment of a combination algorithm between the first probability value and the second probability will be described in detail below.

When the second probability value in which the explicit preference of the user is reflected is obtained from the fuzzy logic inference unit 140, the obtained second probability value is reflected to a previous process of a process of performing a final probability value operation in the Bayesian network learning unit 110 and then, the final probability value of the Bayesian network learning unit 110 is operated. A recommendation list is provided to the user by newly ranking recommendation channels/programs based on the operated result value.

In this instance, when applying the second probability value to the Bayesian network learning unit 110, caution needs to be paid to a case where when the second probability value different from the first probability value, obtained through only existing Bayesian network learning, is utilized, the entire probability value may exceed "1". In this case, the entire system collapses and thus, there is a need for a suitable algorithm capable of maintaining the entire system when applying the second probability value to the Bayesian network learning unit 110.

In an exemplary embodiment of the present invention, a proportional operation algorithm to be described below is employed. For example, the first probability value obtained through the Bayesian network unit 110 with respect to channel or program items including three probability values is assumed to be as shown in the following Table 2.

TABLE 2

| First probability value | |
|---|---|
| 0.1 (10%) | 1.00 (100%) |
| 0.3 (30%) | |
| 0.6 (60%) | |

An item selected by applying the entropy function is assumed to be an intermediate item 0.3 (30%).

The second probability value finally induced through a defuzzification operation after the user inputs a preference with respect to the extracted meaningful channel/program item through the entropy function and a fuzzy logic inference operation with predetermined rules is performed is assumed to be, for example, 0.72 (72%).

As shown in the following Table 3, when simply substituting the second probability value for 0.3 (30%), the entire probability value exceeds 1 (100%) and thus, a problem may occur in the system.

TABLE 3

| | |
|---|---|
| 0.1 (10%) | 1.42 (142%) |
| 0.72 (72%) | |
| 0.6 (60%) | |

The second probability value is the explicit preference that is directly input by the user and thus, this value may not be sacrificed. On the other hand, remaining probability values are values determined when the existing first probability value having a weak meaning is present and thus, these values need to be changed so that the entire system may not be beyond "1".

The specific algorithm is as follows. The second probability value "0.72" is subtracted from "1". By multiplying a probability value obtained as the operation result by a ratio of the remaining first probability value, a new probability value is set as shown in the following Equation 6:

$$(1-0.72) \times \frac{0.1}{(0.1+0.6)} = 0.04$$
$$(1-0.72) \times \frac{0.6}{(0.1+0.6)} = 0.24$$

[Equation 6]

When performing an operation according to the above algorithm, the entire probability value is maintained to be "1", while reflecting the second probability value as shown in the following Table 4:

TABLE 4

| | |
|---|---|
| 0.04 (4%) | 1.00 (100%) |
| 0.72 (72%) | |
| 0.24 (24%) | |

The system in which the second probability value is reflected is updated again in real time with a new probability value through Bayesian network learning. In this instance, a probability value of the newly learned Bayesian network may invalidate an existing probability value based on the preference input by the user. To prevent the above phenomenon, when the second probability value is fixed to be invariable, a change in the preference of the user may not be flexibly reflected.

To solve the above problem, an algorithm corresponding to an exemplary embodiment is proposed as follows.

Each of an x axis and a y axis sets a decreasing linear function having the range of "0" to "1". Any type of function may also be designed.

Figure 7:
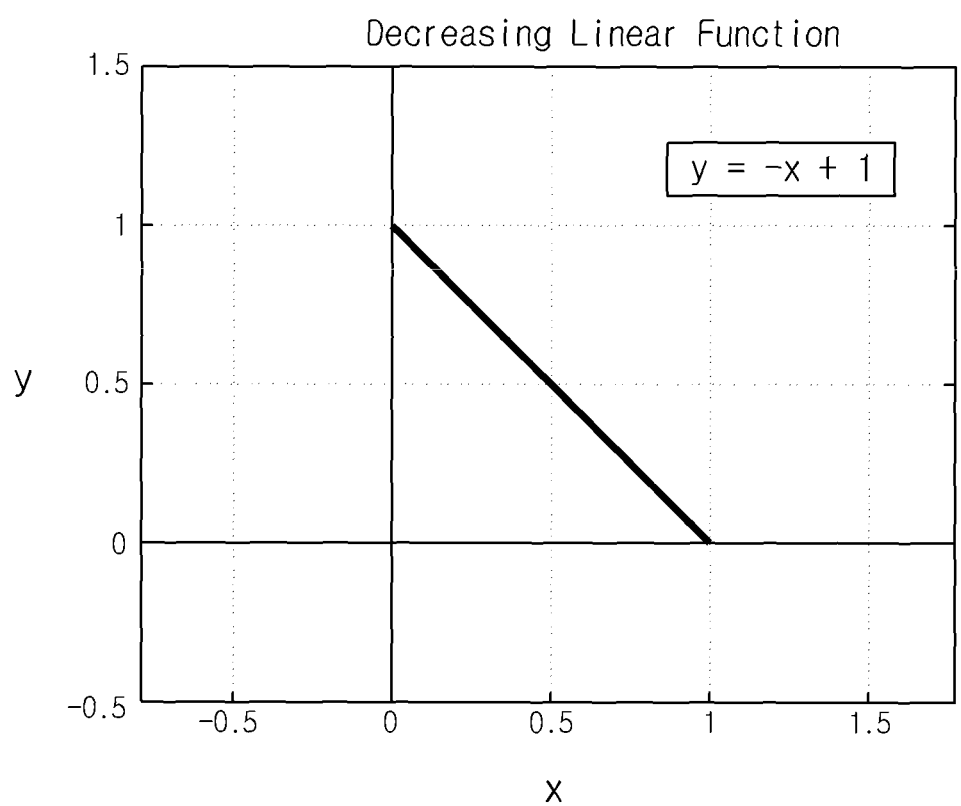
FIG. 7 is a graph illustrating a probable decreasing linear function according to an exemplary embodiment of the present invention.

FIG. 7 is a graph illustrating a probable decreasing linear function according to an exemplary embodiment of the present invention.

As illustrated in FIG. 7, an interval between "0" and "1" of the x axis is divided into sections based on a predetermined ratio. For example, the interval between "0" and "1" may be divided into ten sections at intervals of "0.1". The number of sections may be flexibly adjusted by a designer depending on necessity.

Every time the entire operation process of a system is repeated, a value of the x axis is set starting from an initial section value followed by "0" and a y value is obtained. For example, when the entire operation process is repeated again after the second probability value is initially reflected, and when the x axis is divided into 10 sections at intervals of "0.1", a y value thereof becomes "0.9". Next, when the second entire operation process is repeated, the x value becomes "0.2" and the y value thereof becomes "0.8".

A new second probability value is set by multiplying the obtained y value and the existing second probability value. By doing this, the second probability value to which the user has directly applied the preference decreases gradually over time. When desiring to maintain the affect of the second probability value over a long period of time, a division of the x axis may be divided to be narrow. On the contrary, when desiring to maintain the affect of the second probability value over a short period of time, the division of the x axis may be divided to be wide.

The new second probability value is compared with the first probability value updated in real time through Bayesian network learning.

When the new second probability value is greater than the updated first probability value, the new second probability value is utilized instead of the first probability value updated in real time. Since the new second probability value is different from the existing second probability value, neighboring probability values are also changed to be suitable for the new second probability value. Through the above operation, the entire probability value may be maintained to be "1". The proportional operation algorithm proposed above may be used as the applied algorithm herein. In this instance, probability values used for the proportional operation are based on the first probability values updated in real time.

On the contrary, when the new second probability value is less than or equal to the first probability value updated in real time, the new second probability value is discarded and the first probability value updated in real time through Bayesian network learning is utilized.

Figure 8:
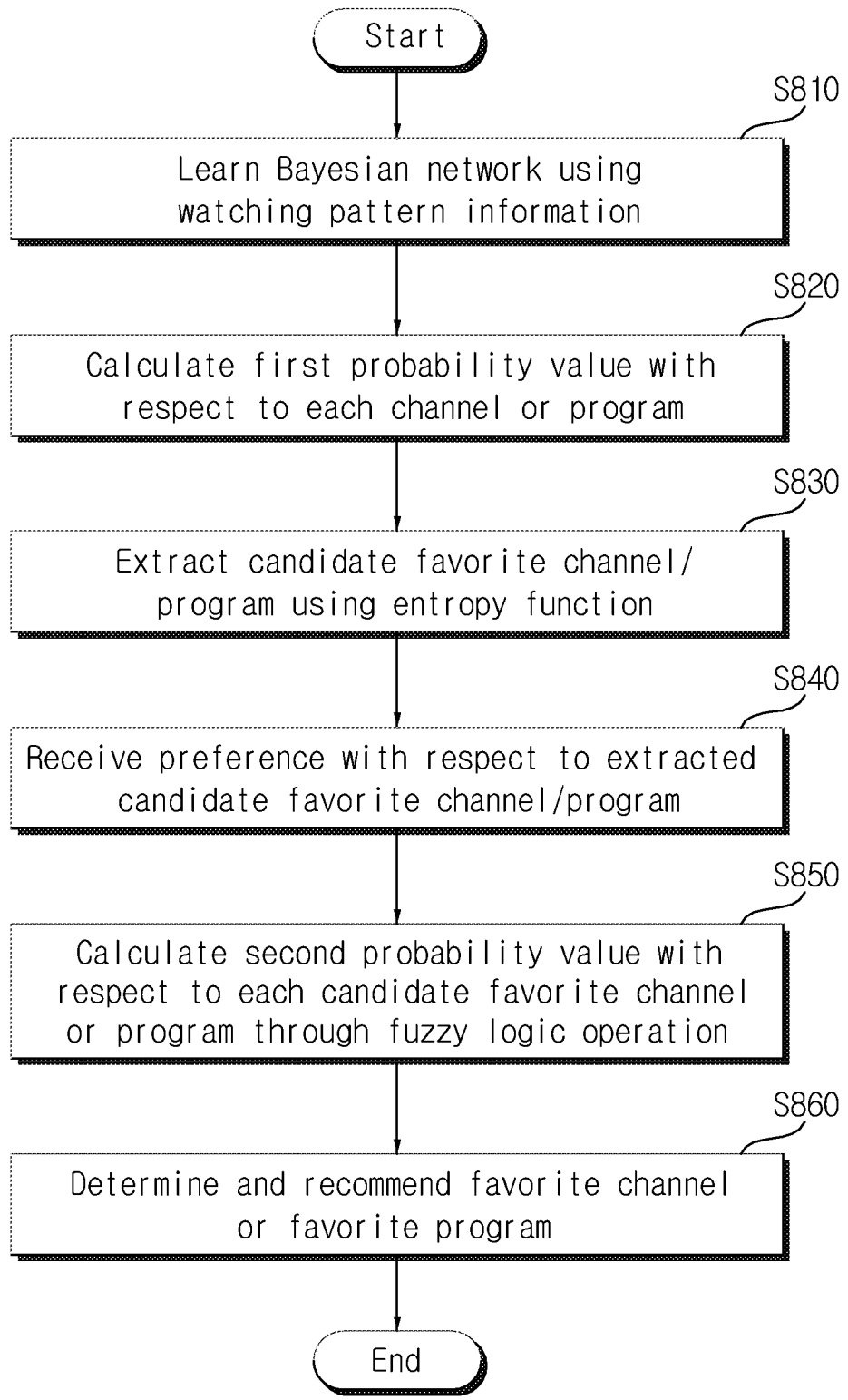
FIG. 8 is a flowchart illustrating a method of recommending a favorite channel/program according to an exemplary embodiment of the present invention.

FIG. 8 is a flowchart illustrating a method of recommending a favorite channel/program according to an exemplary embodiment of the present invention.

As illustrated in FIG. 8, when watching pattern information, for example, an amount of TV watching time for each day during the week D, an amount of TV watching time for each time zone during a day T, a total amount of watching time for each channel C, and an amount of watching time for each program genre G, is received, a system (hereinafter, referred to as a recommendation system) for recommending a favorite channel/program according to the present invention may learn a Bayesian network configured by a designer, based on the received watching pattern information (S810).

Next, the recommendation system may calculate a first probability value with respect to all of the channels or programs based on the learning result (S820).

Next, the recommendation system may extract a candidate favorite channel or a candidate favorite program based on the calculated first probability value (S830).

Next, the recommendation system may propose the extracted candidate favorite channel or candidate favorite program to a user, and may receive, from the user, a preference, for example, "like" or "hate", with respect to each candidate favorite channel or candidate favorite program (S840).

Next, the recommendation system may perform a fuzzy logic operation with respect to each candidate favorite channel or candidate favorite program based on the preference input by the user and a predetermined rule, and may calculate a second probability value with respect to each candidate favorite channel or candidate favorite program based on the performance result (S850).

Next, the recommendation system may finally determine and recommend a favorite channel or a favorite program according to watching pattern information of the user based on the calculated first probability value and second probability value (S860).

Meanwhile, the aforementioned exemplary embodiments of the present invention may be provided in a program that can be executed by computers, and may be configured in a universal-purpose digital computer to operate the programs using computer readable recording media. The computer readable recording media include storage media such as magnetic storage media (for example, ROM, floppy disks, hard disks, and the like), optical media (for example, CD-ROM, digital versatile disks (DVD)), and the like.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A system for recommending a favorite channel/program, the system comprising:
   a processor; and
   a non-transitory computer-readable medium having program instructions embodied therewith, the program instructions being executable by the processor to function as
   a Bayesian network learning unit configured to learn a Bayesian network based on received watching pattern information of a user and to thereby calculate a first probability value with respect to all of the channels or programs based on the learning result;
   a candidate favorite channel/program extracting unit configured to calculate an entropy of the calculated first probability value, and to extract, when the entropy is less than or equal to a predetermined threshold, any of the channels or programs that corresponds to the calculated first probability value as a candidate favorite channel or program;
   a fuzzy logic operation unit configured to perform a fuzzy logic inference operation with respect to the extracted candidate favorite channel or program, and to calculate a second probability value with respect to each candidate favorite channel or program based on a result of the fuzzy logic inference operation; and
   a favorite channel/program recommending unit configured to determine a favorite channel or program according to the watching pattern information of the user based on the calculated first probability value and second probability value.

2. The system of claim 1, wherein the fuzzy logic operation unit performs the fuzzy logic operation based on predetermined rules and a preference received from the user with respect to each candidate favorite channel or program.

3. The system of claim 2, wherein the fuzzy logic operation unit comprises:
   a fuzzifier to perform fuzzification for assigning a membership grade with respect
   to the preference received from the user and thereby output a fuzzified value as the performance result;
   a fuzzy inference unit to perform a fuzzy inference based on the output fuzzified value and the predetermined rules; and
   a defuzzifier to perform defuzzification with respect to a result value obtained as the fuzzy inference result and thereby output a defuzzified second probability value as the performance result.

4. The system of claim 2, wherein the preference is information indicating a favor or a disfavor with respect to each channel or program that is received from the user.

5. The system of claim 2, wherein the predetermined rules indicate an IF-THEN rule that is a sentence expressing a relationship between predetermined facts.

6. The system of claim 1, wherein the favorite channel/program recommending unit employs, as the second probability value, a first probability value of one of the channels or the programs, and updates the first probability value of a remaining channel or program through a proportional operation based on the second probability value of the one channel or program, and thereby determines and recommends the favorite channel or the favorite program based on the updated first probability value.

7. The system of claim 1, wherein the watching pattern information comprises an amount of television (TV) watching time for each day, an amount of TV watching time for each time zone, a total amount of watching time for each channel, and an amount of watching time for each program genre.

8. A computer-executable method of recommending a favorite channel/program, the method comprising:
   learning, by a processor, a Bayesian network based on received watching pattern information of a user to thereby calculate a first probability value with respect to all of the channels or programs based on the learning result;
   calculating, by the processor, an entropy of the calculated first probability value, and extracting, when the entropy is less than or equal to a predetermined threshold, any of the channels or programs that corresponds to the calculated first probability value as a candidate favorite channel or program;
   performing, by the processor, a fuzzy logic inference operation with respect to the extracted candidate favorite channel or program, and calculating a second probability value with respect to each candidate favorite channel or program based on a result of the fuzzy logic inference operation; and
   determining, by the processor, a favorite channel or program according to the watching pattern information of the user based on the calculated first probability value and second probability value.

9. The method of claim 8, wherein the performing a fuzzy logic inference operation includes performing the fuzzy logic operation based on predetermined rules and a preference received from the user with respect to each candidate favorite channel or candidate favorite program.

10. The method of claim 9, wherein the calculating of the second probability value comprises:

performing fuzzification for assigning a membership grade with respect to the preference received from the user to thereby output a fuzzified value as the performance result;

performing a fuzzy inference based on the output fuzzified value and the predetermined rules; and performing defuzzification with respect to a result value obtained as the fuzzy inference result and thereby outputting a defuzzified second probability value as the performance result.

11. The method of claim 9, wherein the preference is information indicating a favor or a disfavor with respect to each channel or program that is received from the user.

12. The method of claim 9, wherein the predetermined rules indicate an IF-THEN rule that is a sentence expressing a relationship between predetermined facts.

13. The method of claim 8, wherein the determining a favorite channel or program includes employing, as the second probability value, a first probability value one of the channels or the programs, and updating the first probability value of a remaining channel or program through a proportional operation based on the second probability value of the one channel or program, to thereby determine and recommend the favorite channel or the favorite program based on the updated first probability value.

14. The method of claim 8, wherein the watching pattern information comprises an amount of TV watching time for each day, an amount of TV watching time for each time zone, a total amount of watching time for each channel, and an amount of watching time for each program genre.

* * * * *